US008832265B2

(12) United States Patent
Kozine et al.

(10) Patent No.: US 8,832,265 B2
(45) Date of Patent: Sep. 9, 2014

(54) AUTOMATED ANALYSIS SYSTEM FOR MODELING ONLINE BUSINESS BEHAVIOR AND DETECTING OUTLIERS

(75) Inventors: Mikhail Borisovich Kozine, San Francisco, CA (US); Robert I. Wenig, San Francisco, CA (US); Travis Spence Powell, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 13/461,168

(22) Filed: May 1, 2012

(65) Prior Publication Data

US 2013/0297767 A1  Nov. 7, 2013

(51) Int. Cl.
*G06F 15/173* (2006.01)
*G06F 11/34* (2006.01)
*G06Q 10/06* (2012.01)

(52) U.S. Cl.
CPC ............ *G06F 11/34* (2013.01); *G06Q 10/0639* (2013.01)
USPC ............................. 709/224; 709/219; 719/318

(58) Field of Classification Search
CPC ............................ G06F 11/34; G06Q 10/0639
USPC ................. 709/217, 219, 223, 224, 227, 228; 719/318
See application file for complete search history.

(56) References Cited

U.S. PATENT DOCUMENTS

| | | | |
|---|---|---|---|
| 6,898,597 B1 | 5/2005 | Cook et al. | |
| 7,620,523 B2 * | 11/2009 | Marvasti et al. | 702/183 |
| 7,734,607 B2 * | 6/2010 | Grinstein et al. | 707/705 |
| 2003/0163365 A1 | 8/2003 | Farnes | |
| 2003/0195395 A1 | 10/2003 | Gotschim | |
| 2004/0103051 A1 | 5/2004 | Reed | |
| 2005/0165736 A1 | 7/2005 | Oosta | |
| 2008/0005793 A1 | 1/2008 | Wenig | |
| 2008/0288306 A1 | 11/2008 | MacIntyre | |
| 2010/0031156 A1 * | 2/2010 | Doyle et al. | 715/736 |
| 2010/0082301 A1 | 4/2010 | Skibiski | |
| 2010/0332475 A1 | 12/2010 | Birdwell | |
| 2011/0078004 A1 | 3/2011 | Swanson | |
| 2011/0320880 A1 | 12/2011 | Wenig | |
| 2012/0036256 A1 | 2/2012 | Shen | |
| 2013/0342538 A1 | 12/2013 | Kozine | |

OTHER PUBLICATIONS

International Search Report for PCT/US2013/027917; Date of Mailing Jun. 13, 2013.

(Continued)

*Primary Examiner* — Viet Vu
(74) *Attorney, Agent, or Firm* — Stolowitz Ford Cowger LLP

(57) ABSTRACT

A two-module system is created for automated web activity monitoring. A model is generated and model outliers are identified by the first module of the system. Reports are generated that identify the events based on their significance to the outliers. The model may be automatically and periodically regenerated for different historical time periods of the web sessions. New groups of events may be periodically extracted from new web sessions and applied to the previously generated model by the second module of the system. Model outliers may be identified from the new groups of events. The new events may be analyzed and reported to a web session operator based on their contribution to any identified outliers. Even if no outliers are detected, the new events having a most significant impact on web session operating conditions may be identified and reported in real-time.

21 Claims, 12 Drawing Sheets

(56) References Cited

OTHER PUBLICATIONS

Written Opinion of the International Searching Authority for PCT/US2013/027917; Date of Mailing Jun. 13, 2013.

Militino A F et al., "Outliers detection in multivariate spatial linear models," Journal of Statistical Planning and Interference, Elsevier, Amsterdam, NL, vol. 136, No. 1, Jan. 1, 2006, pp. 125-146.

Accenture booklet; downloaded from: http://www.accenture.com/SiteCollectionDocuments/PDF/Accenture-Customer-Insight-Overview-Flyer-5-11.pdf; 2011.

R. J. Kuo, K. Chang & S. Y. Chien. (2004) Integration of Self-Organizing Feature Maps and Genetic-Algorithm-Based Clustering Method for Market Segmentation; Journal of Organizational Computing and Electronic Commerce. vol. 14, Issue 1, pp. 43-60.

Greenwell, T. C.; Fink, J. S.; Pastore, D. L. (2002) Perceptions of the service experience: using demographic and psychographic variables to identify customer segments; Sport Marketing Quarterly 2002 vol. 11 No. 4 pp. 233-241.

L.Eriksson, E.Johansson, N.Kettaneh-Wold, J.Trygg, C.Wikstroem, S.Wold "Multi- and Megavariate Data Analysis" 2006, Umetrics PLS-DA.

Avinash Kaushik. Web Analytics 2.0, Wiley Publishing, 2010. Principal component analysis.

Novak, Thomas et al.; Measuring the Customer Experience in Online Environments: A Structural Modeling Approach, Marketing Science, vol. 19, No. 1, Winter 2000, pp. 22-42, 1526-548X electronic ISSN.

Rho, Jae Jeung, et al.; Internet Customer Segmentation Using Web Log Data; Journal of Business and Economics Research; vol. 2, No. 11; pp. 59-74; Nov. 2004.

User's Guide to SIMCA-P, SIMCA-P+; Umetrics AB; downloaded from http://www.umetrics.com/Content/Document%20Library/Files/UserGuides-Tutorials/SIMCA-P_11_UG.pdf; May 2005.

Bertsimas, et al., A Learning Approach for Interactive Marketing to a Customer Segment; Operations Research vol. 55, No. 6, pp. 1120-1135; Nov.-Dec. 2007.

Stolowitz Ford Cowger LLP; Listing of Related Cases; Mar. 17, 2014.

* cited by examiner

| DTS | UNIQUEID | V(TOTAL_COUNT) |
|---|---|---|
| 10/29/2011 19:00 | 1134 | 124 |
| 10/29/2011 19:00 | 716 | 2419 |
| 10/29/2011 19:00 | 925 | 11259 |
| 10/29/2011 19:00 | 748 | 1996 |
| 10/29/2011 19:00 | 530 | 3 |
| 10/29/2011 19:00 | 83 | 62 |
| 10/29/2011 19:00 | 893 | 835 |
| 10/29/2011 19:00 | 832 | 16642 |
| 10/29/2011 19:00 | 25 | 2083 |

FIG. 4A

| DTS | V.1 | V.5 | V.6 | V.7 | V.8 | V.9 | V.12 | V.13 | V.15 | V.22 | V.25 | V.27 |
|---|---|---|---|---|---|---|---|---|---|---|---|---|
| 10/29/2011 19:00 | 343697 | 1444 | 4 | 34 | 47 | 1196 | 341 | 2314 | 381 | 2 | 2083 | 455 |
| 10/29/2011 20:00 | 323366 | 1410 | 3 | 33 | 59 | 1259 | 353 | 2132 | 830 | 5 | 1944 | 405 |
| 10/29/2011 21:00 | 303820 | 1753 | 3 | 29 | 57 | 1167 | 304 | 2027 | 549 | 4 | 1970 | 413 |
| 10/29/2011 22:00 | 289300 | 1892 | 13 | 36 | 45 | 1128 | 241 | 2187 | 650 | 2 | 1796 | 415 |
| 10/29/2011 23:00 | 273314 | 2223 | 27 | 29 | 51 | 1145 | 249 | 1563 | 834 | NA | 1871 | 364 |
| 10/30/2011 0:00 | 277625 | 2017 | 106 | 24 | 48 | 1134 | 263 | 1774 | 666 | 1 | 1806 | 362 |
| 10/30/2011 1:00 | 292689 | 1805 | 76 | 36 | 60 | 1107 | 305 | 2090 | 636 | 1 | 1757 | 347 |
| 10/30/2011 2:00 | 284262 | 1993 | 17 | 37 | 53 | 1086 | 262 | 2258 | 570 | 2 | 1572 | 305 |
| 10/30/2011 3:00 | 265317 | 2491 | 7 | 34 | 56 | 979 | 213 | 1784 | 555 | NA | 1541 | 333 |
| 10/30/2011 4:00 | 243611 | 2453 | 18 | 23 | 35 | 794 | 190 | 1345 | 551 | 2 | 1379 | 253 |
| 10/30/2011 5:00 | 213285 | 3094 | 35 | 21 | 31 | 689 | 134 | 1508 | 408 | NA | 996 | 193 |

FIG. 4B

AUTOMATED ANALYSIS SYSTEM FOR MODELING ONLINE BUSINESS BEHAVIOR AND DETECTING OUTLIERS

BACKGROUND

Data-driven e-business environments have to deal with overwhelmingly large amounts of data. These large amounts of data can make it difficult to monitor the general health of an e-business system and answer everyday business questions such as whether a portal is functioning normally or why business today is different from business yesterday or why it is different from business the same day last week.

Data sources may be spread across a company. For example, computer usage information may be used by an Information Technology (IT) division of the company and sales information may be used by sales and marketing divisions of the company. Some data sources may give identical results, whereas other data sources may become outdated and have no impact on the business. All of these diverse types of information may create a garbage effect that obscures important business events in the enterprise system.

A selective individual (univariate) statistical approach may heuristically pick important sources of information for monitoring in the enterprise system but may not identify other important events that may be the cause of a system abnormality. Monitoring individual data items also may produce false alarms that can diminish the credibility of the reporting system.

BRIEF DESCRIPTION OF THE DRAWINGS

FIGS. 4A and 4B depict examples of tables showing occurrences of web session events.

DETAILED DESCRIPTION

Figure 1:
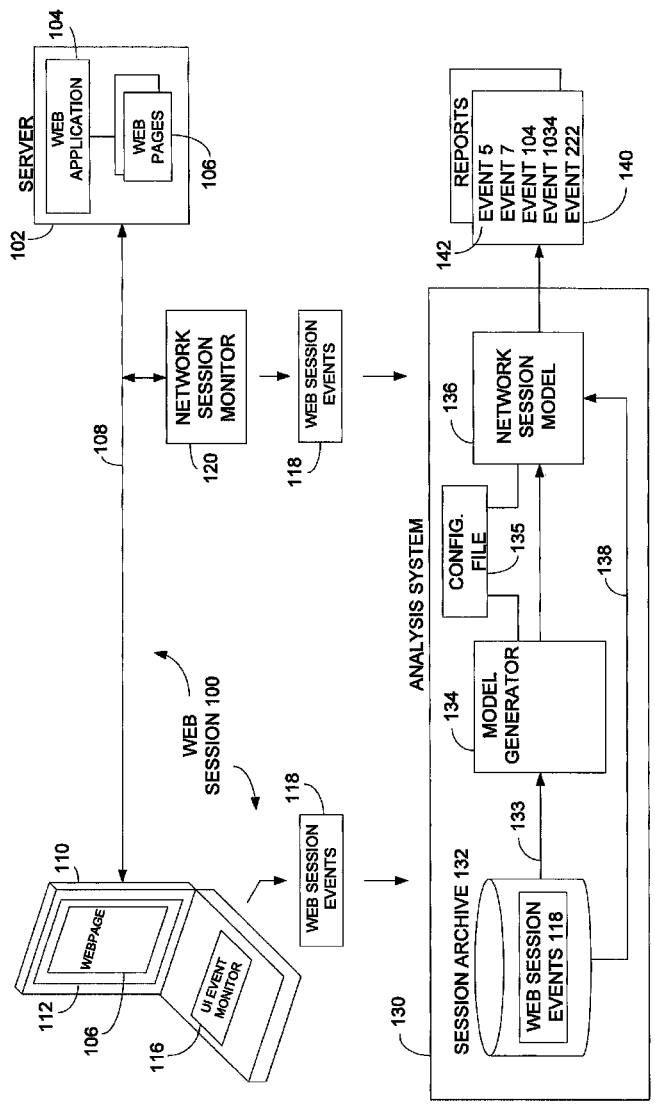
FIG. 1 depicts an example of a web session analysis system.

FIG. 1 depicts an example of an analysis system 130 that automatically generates models for normal network session activity and uses the models to identify outliers and detect significant web session events. The analysis system 130 accesses stored web session events data 118 from a database referred to as a session archive 132. Web session events data 118 may contain important information about user experiences during the web sessions 100. However, as explained above, revealing this information may not be straightforward. For example, a drop in online sales may be associated with a group of web session events happening coherently at certain periods. In this case it is practically impossible to detect and explain this anomaly by cherry-picking and monitoring individual events data. Moreover, other web session events 118 incorrectly selected from session archive 132 may produce other error messages preventing an operator from correlating the significance of particular user interface events data with the drop in sales.

Analysis system 130 deals with these problems by analyzing the whole set of available web session events and by automatically selecting only those events that are informationally important for the model. This way, analysis system 130 actually turns the problems associated with too many web session events into an asset by using the large number of different web session events to generate a more holistic model of the e-commerce system while at the same time isolating the most likely causes of abnormal e-commerce system behavior.

Analysis system 130 generates a network session model 136 that models normal operating web sessions. Model 136 may identify outliers in the model space that indicate unusual web session operations and identify the list of web session events 142 that have the highest contributions to the outliers.

The web session modeling can also minimize the number of false alarms. For example, certain events may appear to be outliers when analyzed individually. However, the multivariate web session model can determine that such web session conditions are associated with normal web site operations or can determine that certain web session events have little significance to an abnormal web session condition. Analysis system 130 can also identify duplicate web session events that may operate in a same manner in the web session model but may be given different event names. For example, events producing the same results can be inadvertently created by different departments of the company. One of the duplicated events can then be removed from further capture operations.

Web Session Events

Web sessions 100 may be conducted between a web application 104 operating on a web server 102 and different user devices 110. Web application 104 may be configured for any type of online session such as online purchases or online financial services. Of course, these are just examples, and any type of electronic web based transaction or online activity may be performed using web application 104.

User device 110 may comprise a Personal Computer (PC), laptop computer, wireless Personal Digital Assistant (PDA), cellular telephone, or any other wired or wireless device that accesses and exchanges information with web application 104. It should be understood that multiple user devices 110 may conduct different web sessions 100 with web application 104. However, for explanation purposes, only one user device 110 is shown in FIG. 1.

User device 110 may communicate with web application 104 over a network connection 108. Network connection 108 may comprise any combination of connections over an Internet network, a wireless network, a telephone network, Public Services Telephone Network (PSTN), a cellular network, a Wi-Fi network, a cable network, a Wide Area Network (WAN), a Local Area Network (LAN), or the like, or any combination thereof.

In one example, user device 110 may send a Hyper Text Transfer Protocol (HTTP) request to web application 104 over network connection 108. Web application 104 may send back one or more of webpages 106 in response to the HTTP request and user device 110 may display the webpages 106 via a web browser 112 on a screen of user device 110. A user may generate user interface (UI) events during the web session 100. For example, the user may select links on displayed webpages 106 or enter keystrokes that insert data into fields within the displayed webpages 106. Web application 104 may send additional webpages 106 and/or responses to user device 110 in response to the user interface events.

Different web session monitors 116 and/or 120 may capture web session events 118 during web sessions 100. Web session events 118 may comprise the user interface events generated on user device 110 and any network data transferred over network connection 108 between user device 100 and web application 104. For example, the web session events 118 may comprise the HTTP requests and other data requests sent from user device 110 to web application 104 and the webpages and other responses sent back to user device 110 from web application 104.

Some of the web session events 118 may never be transferred over network connection 108. For example, some of the user interface events, such as mouse clicks, keystrokes, alpha-numeric data entered into webpage fields, selection of webpage icons, or the like, or any combination thereof, may change a current state of webpage 106 without sending any data over network connection 108. In another example, a batch data transfer of only completed information from webpage 106 may be transferred to web application 104 over network connection 108.

Some of the web session events 118 may comprise data sent from web application 104 in response user interface events. For example, web session events 118 may include airline scheduling data used for populating a drop down menu in a previously downloaded webpage 106. The airline scheduling data may have been sent by web application 104 in response to a user entering a city destination into an airline destination field of displayed webpage 106.

Other web session events 118 may comprise webpage logic/code sent by web application 104 along with the webpages 106 to user device 110 that further determine the different states or operations in the webpage. The webpage logic may autonomously change the state of webpages 106 or the state of web session 100 on user device 110 without ever sending a request or information back over network connection 108 to web application 104.

In another example, some web session events 118 may comprise Document Object Model (DOM) changes within webpages 106. For example, changes in the DOM of displayed webpage 106 may be captured by UI event monitor 116 as some of web session events 118. In yet another example, web session events 118 may comprise operating parameters and any other logged data in user device 110 and/or server 102. For example, web session events 118 may comprise network bandwidth indicators, processor bandwidth indicators, network condition indicators, computer operating conditions, or the like, or any combination thereof.

In one example, network session monitor 120 may capture the network data, such as the webpages 106, requests, responses, and/or logic exchanged between user device 110 and web application 104 over network connection 108. User Interface (UI) monitor 116 may capture the user interface events generated locally at user device 110. In another example, UI monitor 116 also may capture some or all of the network data exchanged between user device 110 and web application 104 over network connection 108.

In yet another example, UI event monitor 116 and/or network session monitor 120 may not capture some or all the actual web session events 118 but may only detect occurrences of some web session events 118. In this example, monitors 116 and 120 may send unique identifiers identifying occurrences of web session events 118 and may send timestamps indicating when the web session events were detected.

Examples of systems for capturing and/or identifying web session events are described in U.S. Pat. No. 6,286,030 issued Sep. 4, 2001, entitled: Systems and Methods for Recording and Visually Recreating Sessions in a Client-Server Environment, now reissued as U.S. Pat. No. RE41903; U.S. Pat. No. 8,127,000 issued Feb. 28, 2012, entitled: Method and Apparatus for Monitoring and Synchronizing User Interface Events with Network Data; and U.S. patent application Ser. No. 13/419,179 filed Mar. 13, 2012, entitled: Method and Apparatus for Intelligent Capture of Document Object Model Events which are all herein incorporated by reference in their entirety.

Web Session Modeling and Monitoring

Web session modeling and monitoring consists of two separate modules: modeling and monitoring. The modeling module works with historical data and creates the model of normal activity. The monitoring module uses the model saved by the modeling module and works with the current web session data, such as web session events captured during the last hour.

During a model generation phase, analysis system 130 may operate a model generator 134 for generating network session model 136 from web session events 133 associated with a historical model generation time period for web sessions 100. For example, such historical period may comprise the last one to three months data on web sessions 100. Network session model 136 may model a normal operating condition for web sessions 100 and the computer system operating web sessions 100.

Analysis system 130 may generate reports 140 listing the outliers of the normal operating conditions and identifying web session events 142 associated with the outliers. Network session model 136 also may identify which web session events 142 have the highest impact in the associated outliers.

Model generator 134 may select which captured web session events 133 in session archive 132 to use for generating network session model 136. For example, some web session events 118 may be associated with temporary operating conditions, such as a yearly sales promotion. The sales promotion events may not be associated with normal online operating conditions and may be removed from generating model 136 and from reports 140.

During a second monitoring phase, analysis system 130 may use web session model 136 to monitor new web session events 138 from web sessions 100. For example, new web session events 138 may comprise web session events periodically captured and aggregated over a last several minutes, hour, day, week, etc. The number of occurrences for each type of web session event 138 may be aggregated over the monitoring time period. For example, there may be 157 online purchases detected during a last one hour monitoring time period.

Web session events 138 for the monitoring time period are applied to network session model 136 and may operate within the found normal operating model boundaries or as an outlier operating outside the model boundaries. Statistical significance of an outlier being outside the model boundaries may be set to the values that suggest some real business reasons for abnormal behavior. Detected outlier reports 140 are sent to a pre-defined list of addressees. The most influential web session events 142 either for the outlier or for the normal operating time period may be identified in reports 140.

The time periods, thresholds, and other parameters used for generating model 136 and for identifying outliers within model 136 may be preconfigured in a configuration file 135.

Configuration file 135 also may identify black-listed web session events that are removed prior to generating model 136 or removed from reports 140.

The first modeling module (model creation) can either be executed manually or scheduled to be executed automatically. In the latter case the periodicity of model re-creation depends on the length of the historical period used for the model generation. For example, if one month of data is used to create a model, then the model may be re-created at least every 3 weeks or every month. For the second module, web session monitoring is typically scheduled to run automatically and the periodicity of monitoring depends on aggregation granularity. For example, the monitor should be scheduled to run hourly if web session events are aggregated on an hourly basis. In the fully automated mode, after the initial setup, the system may run and provide valuable business insights without any additional human interaction.

Analysis system 130 may be configured to catch and use newly created web session events on the fly. After initial setup, analysis system 130 may operate automatically, or an operator may choose to manually create web session model 136 by selecting specific web session events 118. However, the operator is not required to pre-select any web session events 118, facts, or any other specific information regarding web sessions 100. The operator also does not need to manually correlate or analyze any data distribution results. Thus, the operator does not need to manually pre-select between thousands of possible web session events for analysis.

Analysis system 130 provides a powerful and easy-to-use and to easy-to-interpret system for automatically monitoring the health of e-commerce systems. Multivariate modeling may be used to increase scalability over univariate approaches, since using a wider variety of web session events 118 can model more business aspects of the e-commerce system and create a better holistic representation of user experiences during web sessions 100.

Figure 2:
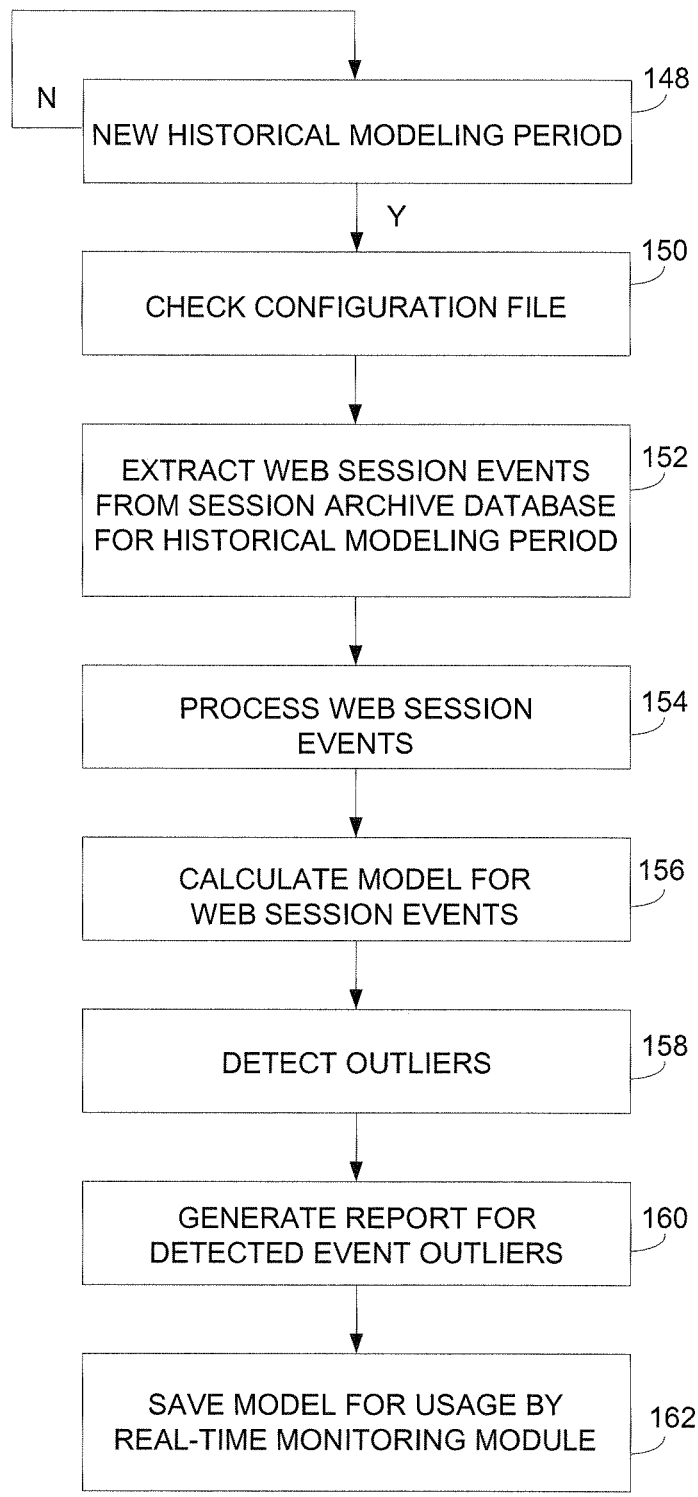
FIG. 2 depicts an example process for modeling normal web customer activity and identifying outliers.

FIG. 2 depicts an example process for generating a web session model for the first module of the system, the model creation. In operation 148, the analysis system may recreate a new model each historical modeling period. For example, a new model may be recreated each month. In operation 150, a configuration file may be checked to identify any model parameters used for generating the model. For example, parameters in the configuration file 135 in FIG. 1 may designate threshold levels used for identifying web session outliers, details on the ODBC connection to the web session database, email server configuration for alert notification and so on.

In operation 152, web session events may be extracted from the session archive database for the historical model period. For example, the web session events may have associated timestamps and the analysis system may extract the web session events from the session archive for the last month of timestamps. In operation 154, the extracted web session events are processed. For example, not all web session events may occur every hour. Missing events are usually not present in the extracted data for a given timestamp. The operation 154 includes processing the missed events and other data cleaning procedures. In operation 156, the model generator may calculate the web session model from the processed web session events. For example, the model generator may generate a multivariate mathematical model from occurrences of the web session events.

In operation 158, outliers are detected for the web session model. For example, the data point associated with a certain timestamp period may be projected by the modeling transformation outside of a normal operating threshold of the model. The outlying timestamp periods are identified in operation 158. Reports may be generated in operation 160 that identify the most significant web session events for the detected outliers. Such reports contain the outlier timestamps and the list of the highest contributing events for each outlier timestamp.

In operation 162, the created multivariate model together with all transformation parameters used to create the model and thresholds used to detect the outliers, are saved onto the hard drive for subsequent usage by the second module of the system, the real-time monitoring module.

Figure 3:
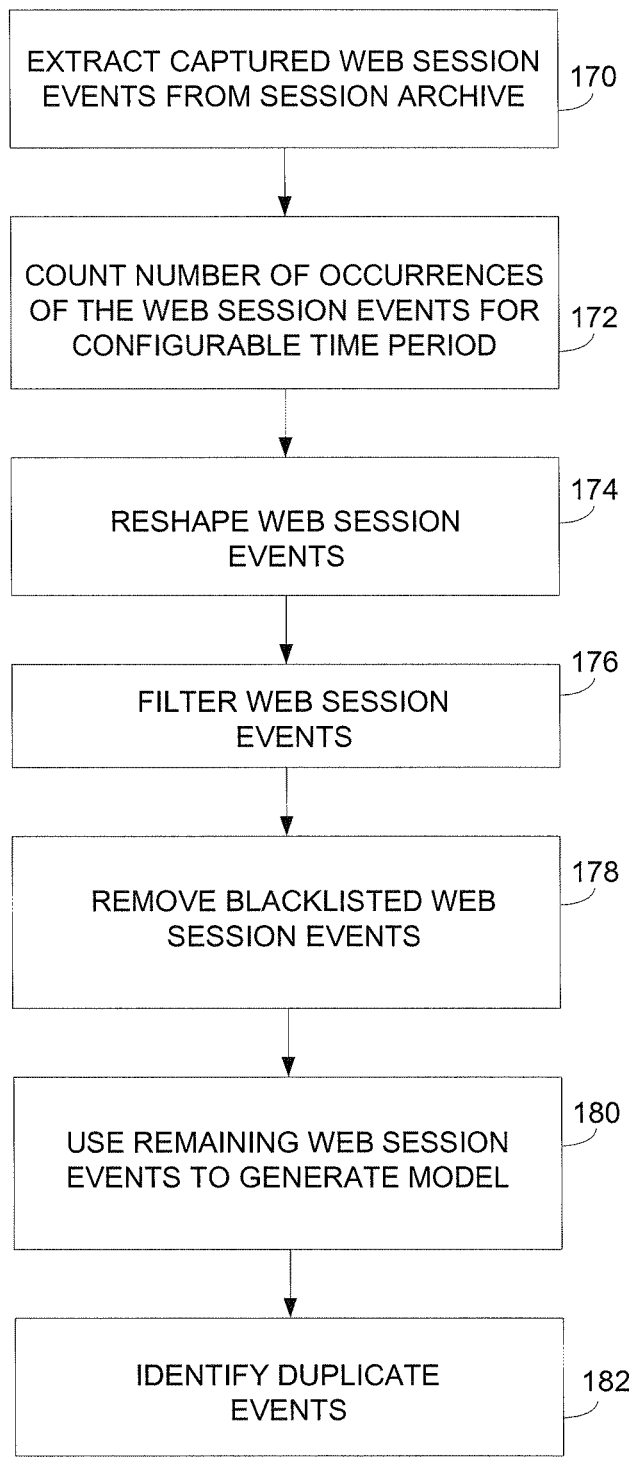
FIG. 3 depicts an example of operations for processing web session events.

FIG. 3 depicts example operations for processing the web session events prior to generating the web session model. In operation 170, the web session events are extracted from the session archive database for the modeling time period. The session archive may be open to any source of data, including flat files. In one example, a Microsoft® SQL database may be used, and an Open Database Connectivity (ODBC) may be used for connection to the database.

In operation 172, the number of occurrences for each web session event may be accumulated for sub-portions of the configurable historical time period. For example, the number of occurrences for each web session event may be aggregated for each hour over a last month of captured historical data. The aggregated web session events may be assigned associated timestamps and listed in a table. The number of occurrences for the web session events may be counted by the monitoring system prior to the aggregated web session events being processed by the analysis system.

In operation 174, the count values for the web session events may be reshaped into a wide table so that every row represents a certain timestamp and every column represents a certain event. Web session events are represented in the columns of the wide table with a unique code (UNIQUEID-coded event variable).

In operation 176, the web session events may be filtered. For example, there may be no occurrences of certain web session events for certain one hour periods. A non-occurrence is alternatively referred to as a Not Applicable (NA). Web session events that only rarely happen might be filtered from the wide table in operation 176. For example, any web session events that have more than X % of NA values may be removed from the wide table. The X % value may be a selectable value specified in the configuration file 135 in FIG. 1 and in one example may have a default value of X=50%. The rationale for this is that a model is created of normal behavior, not exceptional behavior. Events that are rare but important can be monitored by the operator on an individual basis. All remaining NA values after these operations are replaced with zeroes, representing zero occurrences of corresponding events.

In operation 178, some web session events may be removed from web session model generation, monitoring and/or alerting. For example one of the web session events may be caused by an attempt to redeem cash bonus with not enough credits. This event might be fired at abnormal count levels as a result of an ad-hoc marketing campaign. A large number of these events may cause the web session model to produce unnecessary alarms. To avoid annoying alarms the user can temporarily add the event to the blacklist.

If created during a historical period that overlaps with the marketing campaign, the web session model may be too lousy and allow too many outliers to pass unnoticed. In either case, the operator may black-list the web session event to prevent the model from identifying outliers that are usually associated with normal web session operations. The remaining web session events may be used in operation 180 to generate the web session model.

In operation 182, duplicate web session events may be identified. For example, some web session events may have different unique identifiers but may represent the same web session event. For example, two different divisions in an enterprise may have created two different events for capturing the same web session data. The identified web session events may be identified during creation of the web session model and displayed to the operator in operation 182. The operator may reconfigure the monitoring system so that one of the duplicate events is no longer captured and stored in the session archive. This may reduce the amount of processing for capturing, storing, and analyzing duplicate web session events.

FIG. 4A depicts an example of a first table 190 identifying occurrences of web session events for a particular one hour time period as it looks after extraction from the database. In this example, column 192 identifies hour-long time periods. Column 194 lists the unique identifiers associated with each of the different web session events. Column 196 lists the number of occurrences for each of the different web session events for the hour-long time period identified in column 190.

FIG. 4B depicts an example of a second wide table 200 listing all the web session events for the entire historical modeling period after the data reshaping process 174. For example, row 202 may list the number of occurrences for each of the different web session events for a first one hour time period starting at 7:00 pm on Oct. 29, 2011 as previously shown in table 190 of FIG. 4A. Column 204 lists all of the individual one hour time periods during the historical modeling period that in one example may be one month. Column 206 lists the number of occurrences for each of the web session events for each of the one hour time periods listed in column 204.

For example, the web session event assigned unique identifier V.1 had 284,262 occurrences during the one hour time period starting at 2:00 am on Oct. 30, 2011. In another example, the web session event assigned unique identifier V.22 had zero occurrences during the one hour time periods starting at 11:00 pm on Oct. 29, 2011; 3:00 am on Oct. 30, 2011; and 5:00 am on Oct. 30, 2011. Web session event V.22 has few NA's during the period displayed on FIG. 4B, but still passed through the sparsity filter and is included in data modeling and monitoring process.

Figure 5:
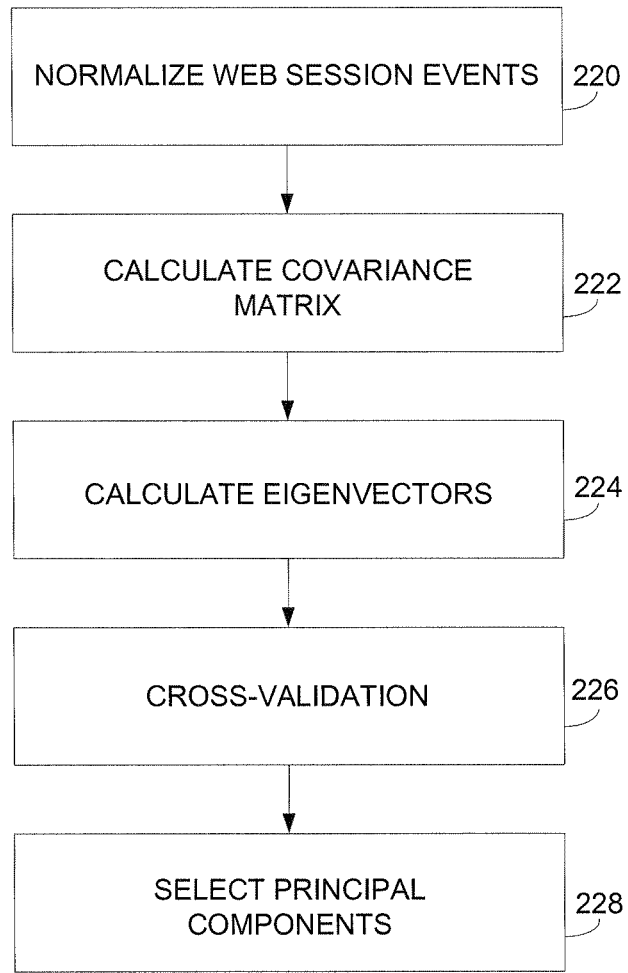
FIG. 5 depicts an example of a process for creating the principal components model for web session data.

FIG. 5 depicts an example of a process for generating the web session model. In operation 220, the number of occurrences of the web session events may be normalized. As explained above, the web session model may represent a normal web session behavior. For different web session events a normal range or occurrences may be different. For example, a normal average number of occurrences for a first web session event per hour may be 10,000 and a normal average number of occurrences for a second web session event per hour may be 5. Thus, the event counts may be normalized in operation 220 to be centered at mean and ranged to fall between 0 and 1.

In operation 222, a covariance matrix may be calculated for the normalized occurrences of the web session events and in operation 224 eigenvectors may be calculated from the covariance matrix. The eigenvectors of the covariance matrix provide the principle components for the web session model.

In operation 226, a cross-validation is performed on the data. Cross-validation may consist of repeated exclusion of data for some of the timestamp periods (timestamp data) and calculation of a total variance ratio retained after application of the principal components to the remaining dataset. This procedure allows estimating a level of noise penetrated into the web session model which is opposite to the predictive power of the model. The cross-validation results may also be used to determine the optimal number of principal components for the model.

A number of principle components for the model are selected in operation 228. The number of principal components can be selected based on different criteria. For example, the number of principal components may be based on a retained variance ratio reaching a pre-defined amount, such as a default value of 85%. Alternatively, the number of principle components can be determined to maximize the predictive power of the model as revealed by the cross-validation process 226. Normalizing data, calculating a covariance matrix and eigenvectors, cross-validating data, and selecting principle components from the data are operations known to those skilled in data processing.

Some operations described below for generating a model may be manually performed using existing software systems and may be described in more detail in L. Eriksson, E. Johansson, N. Kettaneh-Wold, J. Trygg, C. Wikstroem, S. Wold "Multi- and Megavariate Data Analysis" 2006, Umetrics (Eriksson) which is herein incorporated by reference. To create a fully automated modeling component for the system, original software was developed to implement the described algorithms.

Figure 6A:
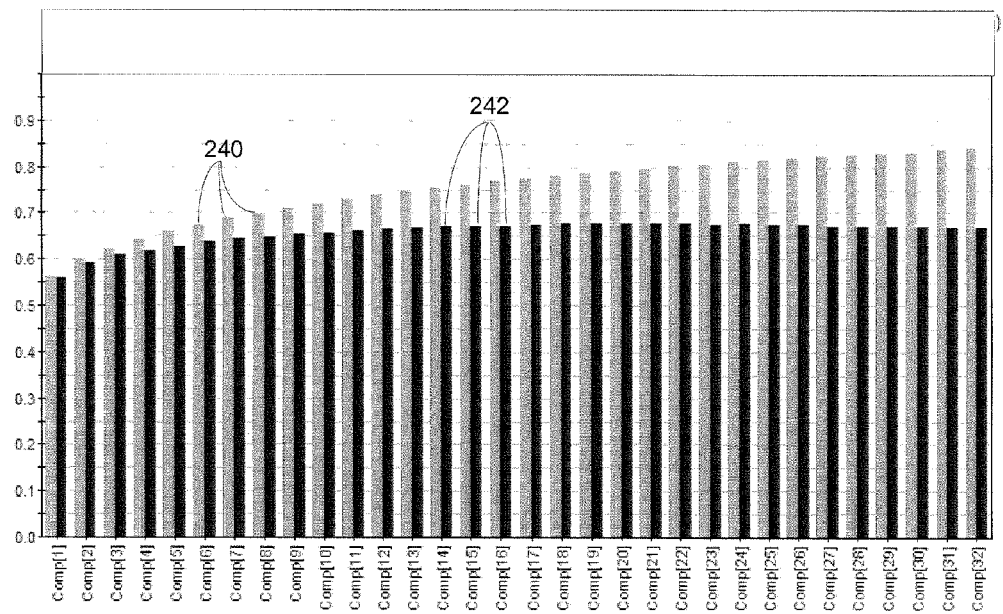
FIGS. 6A and 6B depict examples of graphs showing principle components for a web session model.

FIG. 6A depicts an example histogram for a pertained variance ratio 240 of the timestamp data. Pertained variance ratio 240 grows steadily with each new principal component added to the web session model. Each principal component is a weighted linear combination of the web session events.

A second histogram represents a cross-validation 242 and indicates a predictive power of the web session model. Noise in the data may reduce the relative pertained variance ratio. In one example, principal components may be calculated until the cross-validation ratio 242 reaches a pre-defined threshold portion of the pertained variance ratio. For example, principal components may be added until cross-validation ratio 242 reaches a default of 85% of the pertained variance ratio 240. This may indicate a threshold value where additional principal components may only add noise into the web session model and effectively decrease the predictive power of the model.

Figure 6B:
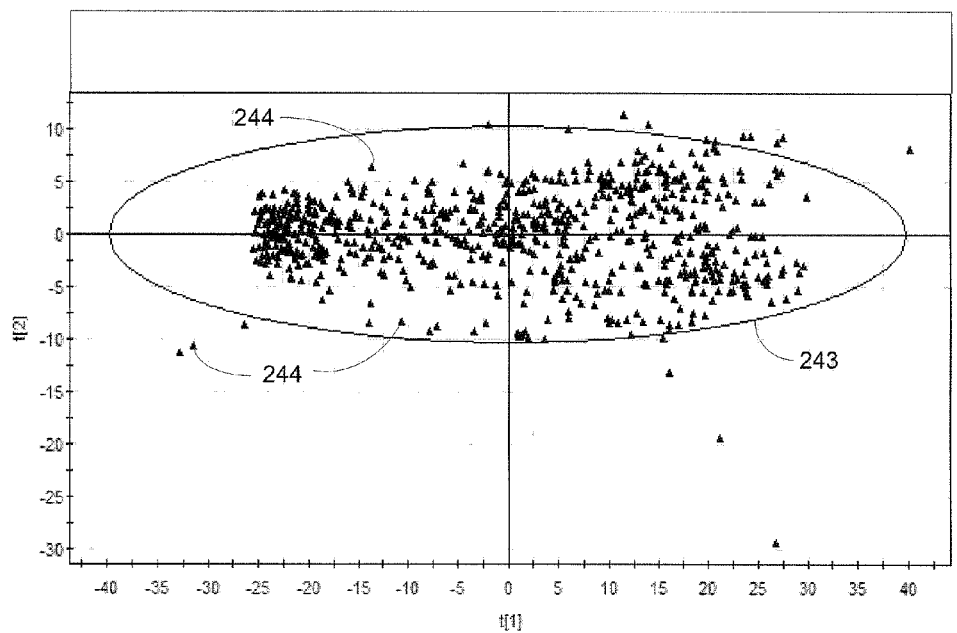

FIG. 6B depicts is a projection of the observations data onto the two-dimensional plane defined by the first two principal components from the web session model. Elements 244 represent timestamped web session event observations and an ellipse 243 represents the statistical confidence ellipsoid as projected onto the same plane. A default confidence level may be 95%, meaning that all the observation points outside the ellipsoid represent statistically abnormal activity with 95% confidence level. Any elements 244 located outside of ellipse 243 may therefore be investigated further as possible outliers.

In practice, outlier detection is performed not on the projection plane like shown on FIG. 6B, but in the whole principal components space. Two formulas may be used for generating thresholds in multivariate principal component space for the outlier detection.

A first model is based on the notion of Hotelling $T^2$ distance in the model space. Let us denote the total number of model principal components as A and the total number of the timestamped web events observations in the wide table as N. The Hotelling $T^2$ distance for the i-th observation is defined as:

$$T_i^2 = \sum_{a=1}^{A} \frac{t_{ia}^2}{s_{ta}^2}$$

where $t_a$ is the model scores vector and $s_{ta}^2$ is the variance of $t_a$. It is described in Eriksson et al. that $T_i^2 N(N-A)/A(N^2-1)$ satisfies F-distribution with A and (N-A) degrees of freedom. Therefore, the threshold for the outlier detection with 95% confidence level may be calculated as:

$$T_{threshold} = A(N^2-1)/N(N-A)F_{critical}(p=0.05)$$

The second criterion is based on the notion of distance to model. If K denotes the total number of web events included into the model, then normalized distance to the model for the i-th observation is defined as:

$$DModX_t = s_t/s_0$$

$$s_i = \sqrt{\frac{\sum_k e_{ik}^2}{(K-A)}}$$

$$s_0 = \sqrt{\frac{\sum\sum e_{ij}^2}{(N-A-1)(K-A)}}$$

where $E=\{e_{ij}\}$ is the residual matrix for the model. The threshold value for DmodX may be determined based on the fact that $s_i^2/s_0^2$ satisfies F-distribution with the degrees of freedom of observations and the model.

Figure 7B:
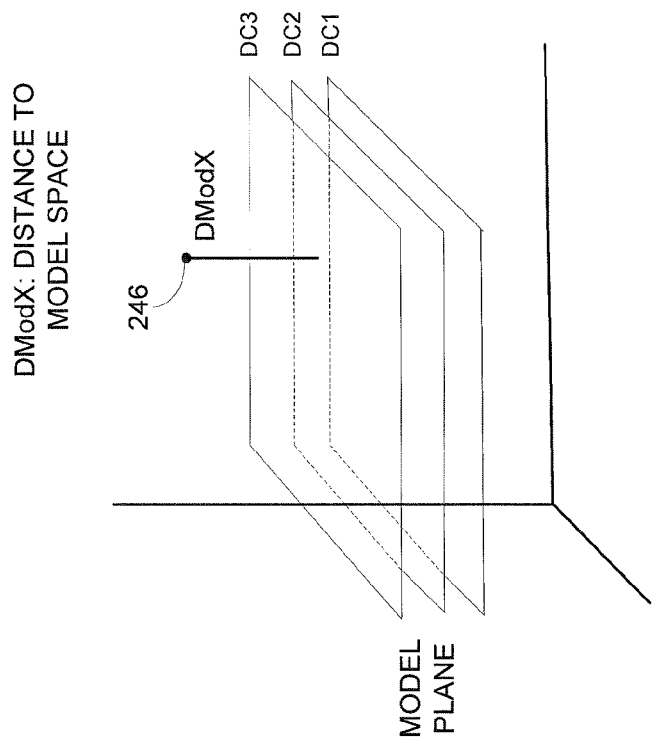
FIGS. 7A and 7B depict examples of two different distances to model generated from the web session events.
Figure 7A:
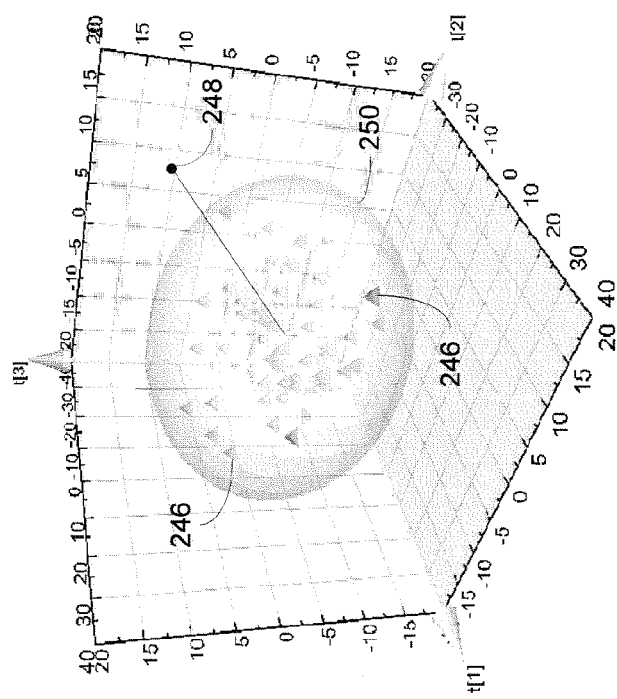

FIG. 7A depicts a visual representation of the Hotelling $T^2$ model identifying distances of elements 246 inside of a model space with the optimum number of principal components identified in FIG. 6A. Ellipsoid 250 represents the model boundary as defined by the threshold of the Hotelling $T^2$ distance. FIG. 7B depicts a visual representation of the DmodX model that identifies distances of elements 246 to the model space. The plane DC2 in FIG. 7B represents an A-dimensional principal components sub-space in K-dimensional space of observations. Each plane DC1 and DC3 represents the DmodX thresholds around the model space that is used to detect the outliers by the distance-to-model method.

Elements 246 in the two model spaces of FIGS. 7A and 7B represent timestamp data observations and the timestamp data observations represent the set of web session events for the given timestamp period, such as a one hour time period. Observation 248 may be identified as an outlier when an associated distance extends beyond threshold 250 for the Hotelling $T^2$ in FIG. 7A or beyond a threshold associated with the DmodX model in FIG. 7B. The thresholds multipliers may be specified by the user in the configuration file 135 in FIG. 1. The threshold multipliers may be used to control the volume of outlier notifications, if needed.

Figure 8A:
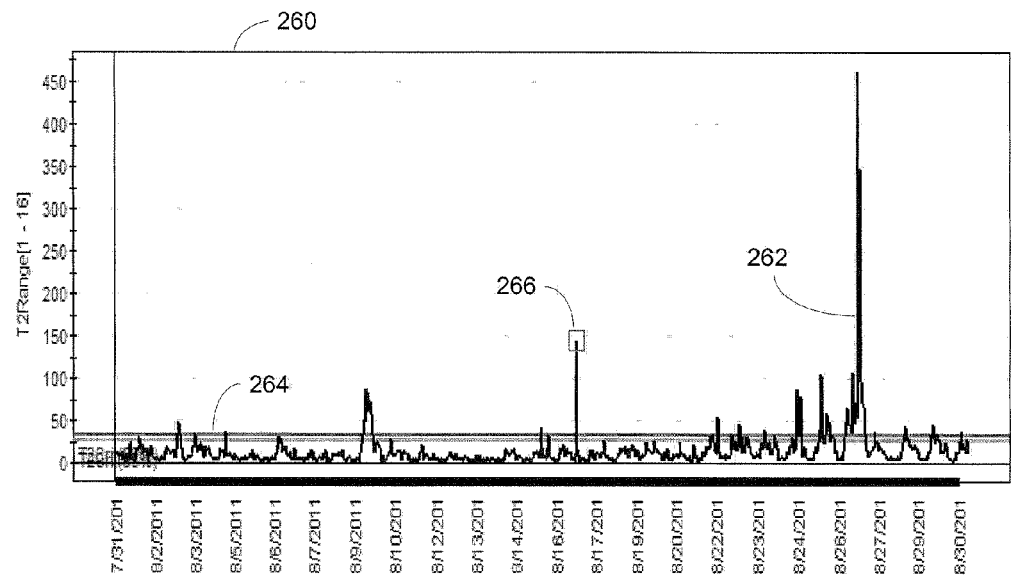
FIGS. 8A-8E depict examples of charts identifying outliers and event contributions one of the outliers.

FIG. 8A depicts an example of a chart 260 having a y-axis identifying the different timestamps and a x-axis identifying the Hotelling $T^2$ distances of the timestamps for the model shown in FIG. 7A. A second chart (not shown) may identify the timestamps and the distances of the timestamps to the model space for the DmodX model shown in FIG. 7B in the same manner. A threshold 264 in chart 260 represents the boundary for the Hotelling $T^2$ model. A timestamp outlier 266 may be any point above the statistical threshold 264 defined for the Hotelling $T^2$ model. Several consecutive outlying timestamps 262 may be considered as one outlier with a duration of several hours. In the case of a prolonged outlier, the timestamp with the maximum distance may be used for the most significant contributors analysis described below.

Figure 8B:
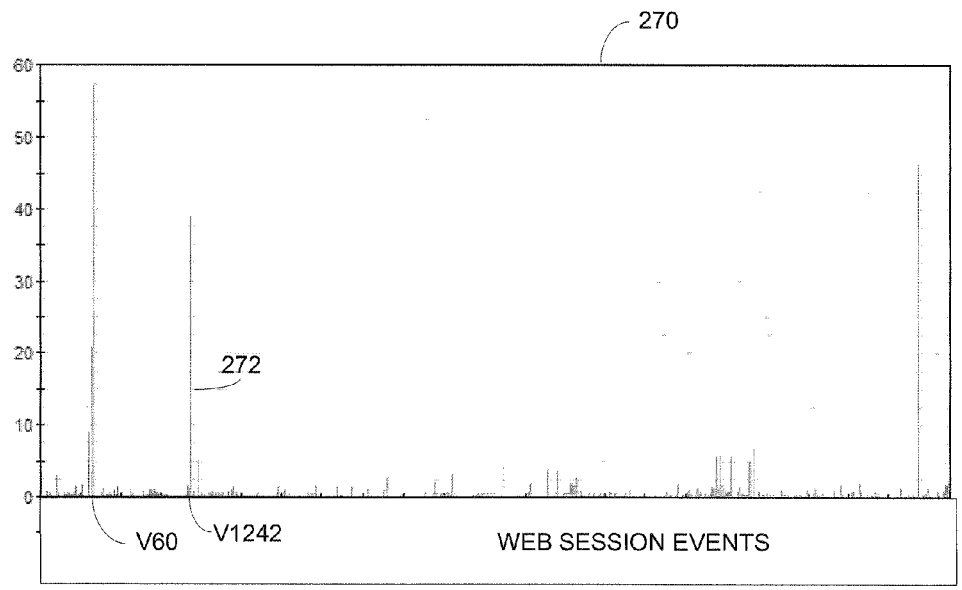

FIG. 8B depicts an example of a contribution chart 270 showing the relative contribution of the different web session events to the timestamp outlier 266 shown in FIG. 8A. The x-axis in chart 270 represents the different web session events and the y-axis represents the normalized contributions of the different web session events to timestamp outlier 266 in FIG. 8A. For example, chart 270 may identify the weighted contribution of each of the web session events to the one hour timestamp outlier 266. As shown in FIG. 8B, a web session event V.60 has a largest contribution and a web session event V.1242 has a second large contribution.

Figure 8C:
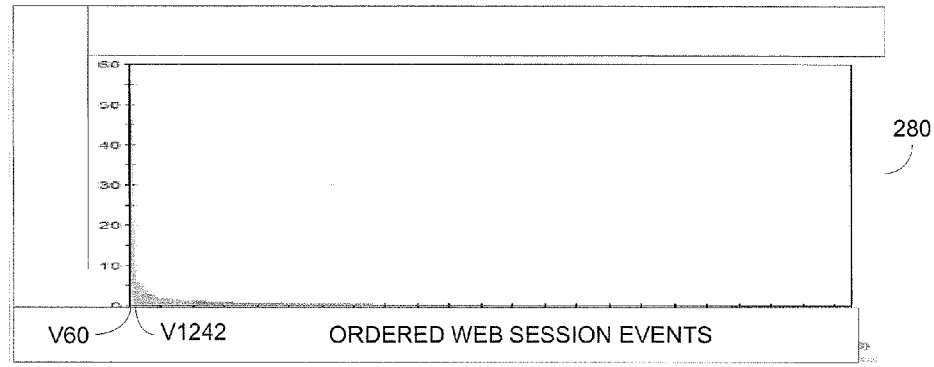

FIG. 8C depicts a chart 280 also showing the contribution of the web session events to timestamp outlier 266 in FIG. 8A. In this example, the y-axis identifies the web session events and the x-axis identifies the different web session events in decreasing order of contribution to outlier 266. The most significant contributors to the outlier that exceed the predefined number of standard deviations above the mean for the chart 280 are referred to as top contributors. If there are no such events, the maximum contributor may be considered a single top mover.

Figure 8D:
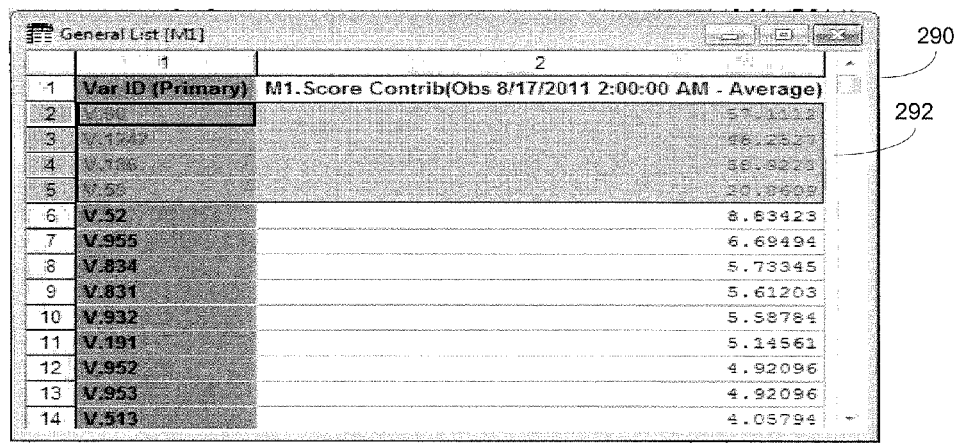

FIG. 8D depicts an example of a table 290 showing the top contributing web session events 292 for timestamp outlier 266 in FIG. 8A. The web session events 292 may be listed in table 290 in order of contribution amount to the Hotelling $T^2$ distance of outlier 266 and may represent web session events that have the most influence in causing the web sessions to operate outside of normal operating conditions. Web session event V.60 was identified as having the most significant contribution to outlier 266 in FIG. 8A and web session event V.1242 was identified as having the second most significant contribution to outlier 266.

For example, the most significant web session event V.60 may be associated with an error message indicating a rental car fare was not found, the second most significant web session event V.1242 may be associated with an error message requesting a user to select a pick-up time, a third most signification event may be associated with an error message requesting a user to select a drop-off time; and a fourth most signification event may indicate a user has been connected to the web application beyond some define time period.

Figure 8E:
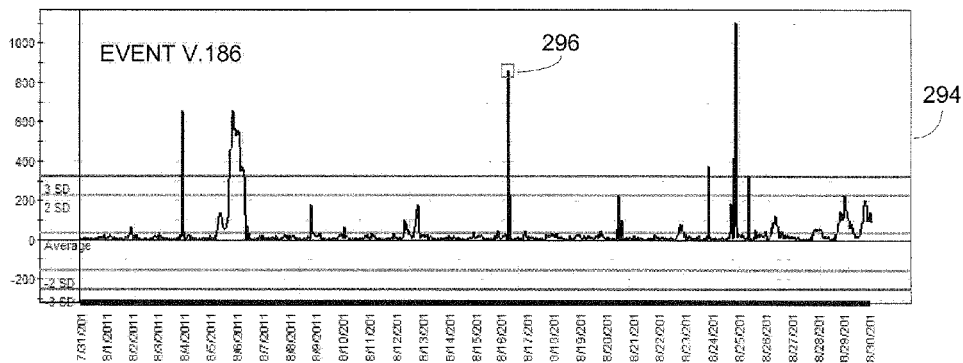

FIG. 8E depicts an example of a chart 294 plotting one of the most significant web session events V.186 contributing to the timestamp outlier 266 in FIG. 8A. Classic univariate Shewart control charts may be calculated for the most significant web session events. Univariate control charts may be calculated for already found outliers and only for demonstration purposes. This is one primary difference between multivariate modeling and traditional univariate control: outliers are found by multivariate modeling and charts may only be performed on the reporting stage. The time and number of occurrences 296 of web session event V.186 associated with timestamp outlier 266 may be marked with a red box. Additional charts can be plotted for the other significant contributors 292 and the timestamps and number of occurrences associated with the timestamp outlier 266 may be marked similarly to event V.186.

Figure 9:
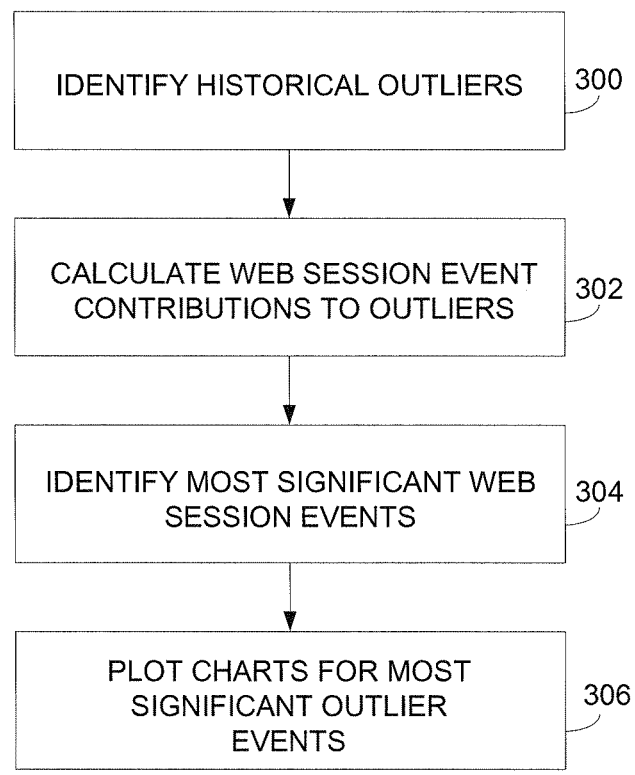
FIG. 9 depicts an example of a process for identifying most significant contributing events.

FIG. 9 summarizes operations for identifying the most significant contributors for timestamp outliers. In operation 300, outliers are identified by the multivariate web session modeling. In operation 302, contributions of the web session events to the timestamp outliers are calculated. In operation 304, the most significant web session event contributors are identified as shown in FIG. 8C. In operation 306, the most significant web session events may be plotted in charts identifying the time and number of occurrences of the web session events associated with the timestamp outliers.

Figure 10:
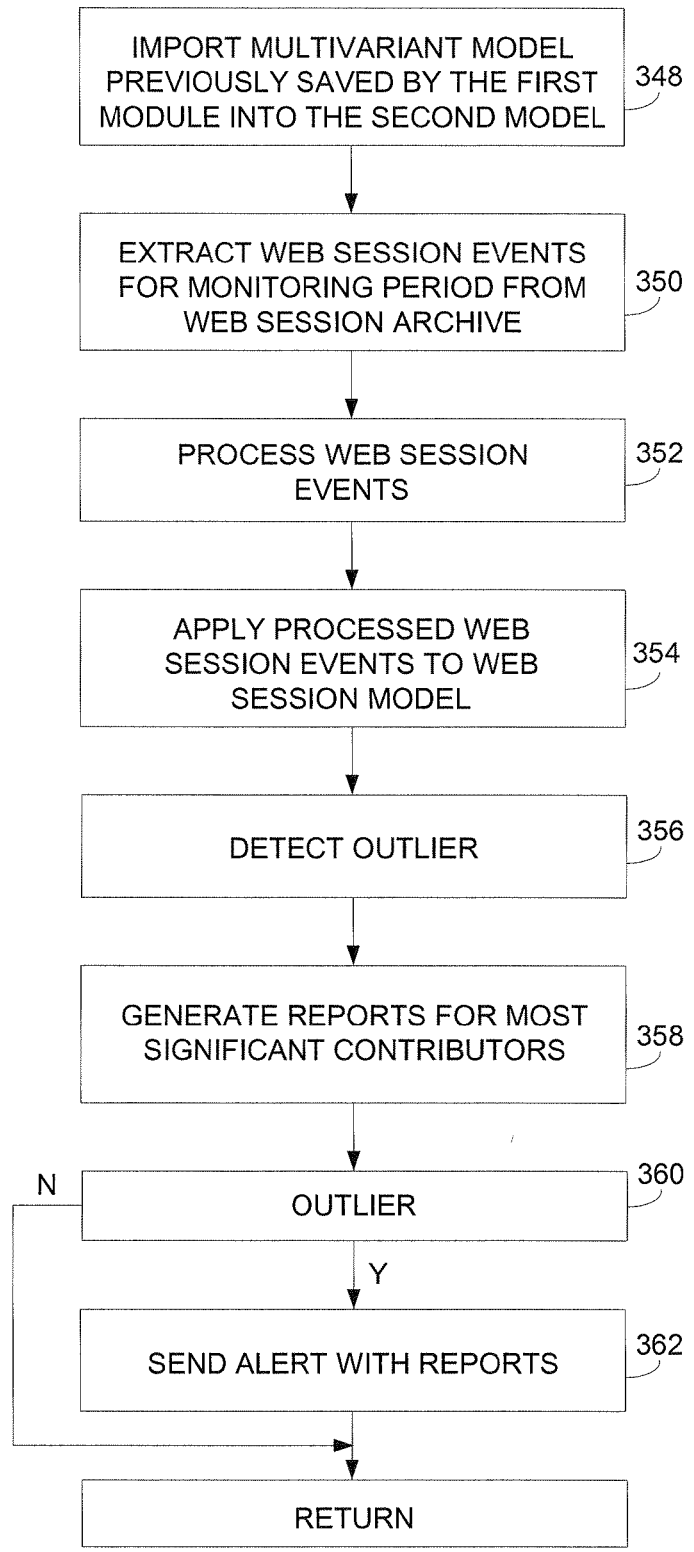
FIG. 10 depicts an example of a process for identifying the most significant events for a real-time monitoring period.

FIG. 10 depicts an example of the second module of the system that provides the real-time monitoring of web sessions using the previously created multivariate model of normal web session activity. In operation 348, the multivariate model previously saved by the first module, is imported into the second module. In operation 350, the analysis system extracts web session events from the session archive database in the same manner previously described above for generating the web session model. However, the web session events may only be for a current monitoring time period and not the entire historical time period. For example, instead of using a month of web session events for generating the model, only a last hour of web session events may be extracted from the session database.

In operation 352, the extracted web session events are processed in a same manner as described above where the first module generates the web session model. For example, occurrences for the last hour of web session events may be reshaped to produce a single-row matrix that is normalized, filtered, and transformed using the model parameters. In operation 354, the processed web session events are applied to the web session model. Application of the saved parameters ensures that the newly extracted web session data is processed by exactly the same method that was applied for the model creation.

In operation 356, the two indicative distances to the model may be calculated for the timestamp element in the model space. For example, the Hotelling T2 and DmodX distances to the model may be calculated for the timestamp representing the one hour monitoring period and then compared to the restored thresholds. The timestamp may be identified as an outlier if the distance is outside of the threshold for either distance to the model. In operation 358, a report may be generated identifying the most significant web session events contributors to the timestamp element.

The outlier notification process is controlled by the parameters stored into the configuration file 135 on FIG. 1. This file contains, among others, the email server configuration and email addresses of the persons responsible for the outlier notification response. The configuration file may also contain verbosity parameter that controls the level of notification that should be applied to the system. The current timestamp may be or may not be an outlier. In operation 358, the analysis system still may list the most significant $\underline{N}$ movers in a report and plot the most significant web session events in graphs. If the timestamp element is not an outlier in operation 360, the graphs identifying the top movers may be displayed in a first color. If the verbosity parameter is equal to 2 (high), an informational email may be sent to the addressees identified in the configuration file. If the timestamp is identified as an outlier in operation 360, the graphs identifying the top movers may be displayed in a second color and an alert message may be sent to the correspondent email addressees in operation 362. For example, the reports and graphs may be emailed to marketing personnel when no outliers are identified and the reports may also be emailed to IT personnel and management personnel when outliers are identified.

Thus, the analysis system identifies the web session events having a highest impact in causing abnormal web session operations. Less significant web session events may not be periodically monitored and/or reported. As explained above, some of the events may be excluded from the reports if the operator knows those events are known to create abnormal system operating conditions, such as a one day promotion.

The modeling and monitoring modules can be operated automatically as autonomous scripts. In one example, the scripts may be scheduled to automatically run approximately half of the historical modeling period used for creating the model. For example, if web session events are retained for one month, the web session model may be automatically refreshed every 2-3 weeks. The monitoring periods also may be programmed to automatically generate reports for programmable time periods, such as for each hour of captured web session events. Any other indicators of model deviation can be used to update the model. For example, the model may be automatically updated after unusual web session activities, such as after a marketing promotion or after a holiday.

Figure 11:
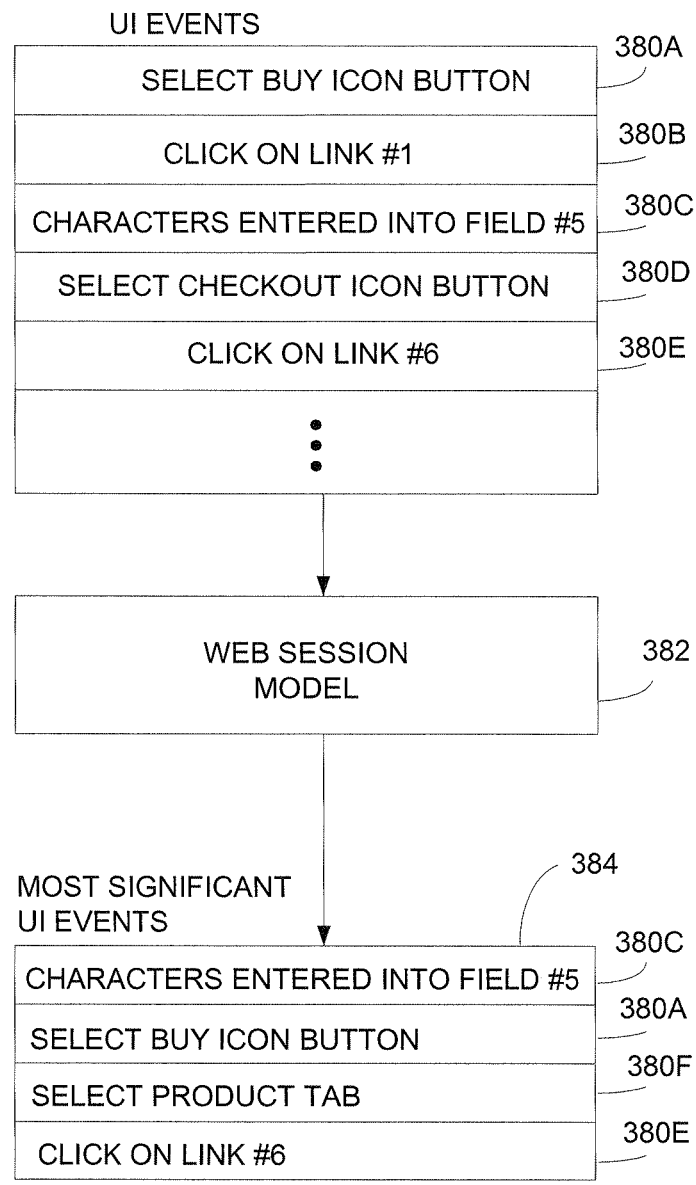
FIG. 11 depicts an example of a process for identifying significant user interface events.

FIG. 11 depicts one example of how significant user interface events may be identified. A group of user interface events 380 may be captured for a historical model generation period or for a more frequent monitoring period. User interface events may include selecting a buy button icon 380A, clicking on a link #1 380B, entering characters into a field #5 380C, selecting a product checkout icon button 380D, and clicking on a link #6 380E. These are of course just examples of any user interface events that may be captured during the web sessions.

The number of occurrences for each of user interface events 380 is counted and the occurrences processed as described above. The processed user interface events may be used to generate web session activity model 382 and/or may be applied to an existing web session model 382. A timestamp data point distance for user interface events 380 is identified and the significance of user interface events 380 to the derived distance are determined as explained above. The timestamp data observation may or may not be identified as an outlier.

A report 384 may be generated listing the user interface events 380 in order of their significance to the timestamp observation distance to the model. For example, user interface event 380C may have been identified as having a most significant influence to the timestamp. The occurrences of user interface event 380A may have been identified as having a second most significant influence to the timestamp and occurrences of user interface event 380F for selecting a product tab may have been identified as having a third most significant influence. If the timestamp observation is identified as an outlier, an alert may be sent along with report 384.

The most significant user inter interface events 380 may provide information on which user interface events are most likely to cause abnormal web session operations or may identify user interface events that are most difficult for users to successfully complete for normal web session operations. For example, the most significant user interface events 380 may be associated with web sessions that did not result in online purchases. Results of reports 384 may be used for customer experience segmentation. For example, user interface events associated with particular web browsers may be segmented and analyzed to determine if user operating errors may be associated with particular web session environments.

Other operations may be initiated based on report 384. For example, a portion of the web session associated with an outlier may be replayed. At least some of the network data associated with the outlier may be synchronized with replaying at least some of the user interface events associated with the outlier in substantially a same order as previously occurring during the web sessions. Replay may provide additional information regarding why the web session operated outside of normal operating boundaries. Capturing and replaying web session events are described in U.S. Pat. No. RE41903 and U.S. Pat. No. 8,127,000 which have both been herein incorporated by reference in their entirety.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. One or more of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a conventional rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of various examples, it should be apparent that the examples may be modified in arrangement and detail without departing from such principles. We claim all modifications and variation coming within the spirit and scope of the following claims.

The invention claimed is:

1. A method, comprising:
   identify, by a processing device, events for web sessions, wherein the events comprise network data including webpages, requests, and/or responses sent over a network between a web server and user devices during the web sessions; and user inputs entered at user devices for interacting with the webpages;
   generating, by the processing device, a model from the events;
   identifying, by the processing device, outliers against the model; and
   generating, by the processing device, reports identifying the events based on a significance of the events to the outliers.

2. The method of claim 1, further comprising:
   replaying the web sessions by synchronizing rendering of at least some of the network data associated with the outliers with replay of at least some of the user inputs associated with the outliers in substantially a same order as previously occurring during the web sessions.

3. The method of claim 1, further comprising:
   automatically extracting, by the processing device, new events for new web sessions;
   generating, by the processing device, transformed data by performing a modeling transformation with the new events;
   calculating, by the processing device, a distance of the transformed data to the model;
   determining, by the processing device, whether the transformed data represent an outlier; and
   generating, by the processing device, at least one of the reports identifying outlier status of the new events and a list of top contributing new events to the distance of the transformed data to the model.

4. The method of claim 3,
   wherein the top contributing new events comprise error messages generated by a web application during the web sessions.

5. The method of claim 3, further comprising;
   identifying, by the processing device, a number of occurrences for each of the events for timestamp periods;
   identifying, by the processing device, model distances of the transformed data for the timestamp periods; and
   identifying, by the processing device, the outliers based on a comparison of the model distances to a threshold value.

6. The method of claim 1, further comprising:
   identifying, by the processing device, some of the events as black-listed events; and
   removing, by the processing device, the black listed events from the reports.

7. The method of claim 6 wherein the black-listed events comprise events known to deviate from a normal operation of the web sessions.

8. The method of claim 1, further comprising removing, by the processing device, a group of the events identified in a configuration file from the events used for generating the model, wherein the group of the events comprise activities known to deviate from a normal operation of the web sessions.

9. The method of claim 1, wherein the reports identify the user inputs having a largest impact on the outliers.

10. The method of claim 1, wherein the model comprises a multivariate model for the web sessions.

11. The method of claim 1, further comprising:
identifying, by the processing device, Document Object Model (DOM) changes for the webpages displayed during the web sessions;
identifying, by the processing device, a number of occurrences of the DOM changes; and
using, by the processing device, the number of occurrences of the DOM changes to generate the model.

12. An apparatus, comprising:
a monitoring system configured to:
capture network data for the web sessions, wherein the network data comprises webpages, requests, and/or responses sent over a network between a web server and user devices during the web sessions; and
capture user interface events for the web sessions, wherein the user interface events comprise user inputs entered at the user devices for interacting with the webpages;
a memory configured to archive web session events for web sessions, wherein the web session events include the network data and the user interface events; and
logic circuitry configured to:
extract the web session events from the memory;
generate a model for the web sessions from the web session events; and
identify how the web session events impact the web sessions based on the model for the web sessions.

13. The apparatus of claim 12, further comprising:
describing with the model a web session customer experience data as a single point in multivariate space of principal components;
calculating a distance of transformed data points associated with the web session events to the model; and
identifying the transformed data points with distances outside of a statistically significant threshold as potential outliers for further analysis.

14. The apparatus of claim 12, wherein the logic circuitry is further configured to:
use the model to identify outliers for the web sessions; and
generate charts for the web session events having most significant contributions to the outliers.

15. The network monitoring system of claim 12 wherein the logic circuitry is further configured to:
use the model to identify outliers for the web sessions;
identify the network data and user interface events associated with the outliers; and
replay the web sessions by synchronizing rendering of at least some of the network data associated with the outliers with replay of at least some of the user interface events associated with the outliers in substantially a same order as previously occurring during the web sessions.

16. A method, comprising:
receiving network events for a network session from a network monitor, the network events including webpage data transmitted over a network between a web server and a user device during the network session;
sending the network events to a session archive;
receiving user interface events associated with the network session and entered from the user device, the user interface events including user inputs for interacting with the webpage data;
sending the user interface events to the session archive;
generating a model for the network session from the network events and the user interface events in the session archive; and
using the model to identify how the network events and user interface events impact operation of the network session.

17. The method of claim 16, further comprising:
identifying outliers for the model; and
identifying the network events and user interface events having a highest contribution to the outliers.

18. The method of claim 16, further comprising replaying the network session by synchronizing rendering of at least some of the webpage data with replay of at least some of the user interface events associated with the outliers.

19. The method of claim 16, further comprising:
describing the user interface events as a single point in multivariate space of principal components associated with corresponding timestamps;
aggregating occurrences of the network events and user interface events for timestamp periods; and
generating the model based on the occurrences of the network events and user interface events for the timestamp periods.

20. The method of claim 16, further comprising:
identifying outliers for the model;
identifying time stamps associated with the outliers;
identifying a portion of the network session associated with the time stamps; and
replaying the network events and user interface events for the portion of the network session.

21. The method of claim 16, further comprising:
identifying duplicate network events or user interface events while generating the model; and
disabling one of the duplicate network events from being captured during the network session.

* * * * *